United States Patent [19]

Motoki

[11] Patent Number: 4,802,921
[45] Date of Patent: Feb. 7, 1989

[54] REFRACTORY COATING COMPOSITION

[75] Inventor: Hideo Motoki, Ibaraki, Japan

[73] Assignee: Minoru Fujii, Osaka, Japan

[21] Appl. No.: 650,579

[22] Filed: Sep. 14, 1984

Related U.S. Application Data

[63] Continuation-in-part of Ser. No. 454,651, Dec. 30, 1982, abandoned.

[30] Foreign Application Priority Data

Dec. 31, 1981 [JP] Japan ................... 56-213081

[51] Int. Cl.⁴ ............... C09D 5/18; C09D 1/02
[52] U.S. Cl. .................. 106/18.12; 106/76; 106/84
[58] Field of Search ............ 106/76, 18.12, 84

[56] References Cited

U.S. PATENT DOCUMENTS 4,171,985  10/1979  Motoki et al. ............... 106/76

FOREIGN PATENT DOCUMENTS

2800805A1  8/1978  Fed. Rep. of Germany .
2041908A   9/1980  United Kingdom .
1578470   11/1980  United Kingdom .

*Primary Examiner*—Paul Lieberman
*Assistant Examiner*—Christine A. Skane
*Attorney, Agent, or Firm*—Armstrong, Nikaido Marmelstein & Kubovcik

[57] ABSTRACT

Refractory coating compositions comprising as the active components:
(A) a water-soluble alkali metal silicate,
(B) a hardening agent for the alkali metal silicate, and
(C) a material having an ability to release the water contained therein in larger amounts at increased high temperatures.

6 Claims, No Drawings

REFRACTORY COATING COMPOSITION

This application is a continuation, of application Ser. No. 454,651, filed Dec. 30, 1982, now abandoned.

This invention relates to compositions for forming refractory coatings and to those for preparing lightweight refractory bodies.

Generally coating compositions for depositing refractory coatings (hereinafter referred to as "refractory coating compositions") have heretofore found extensive applications in various fields which require fire retardation.

Important requirements for an ideal refractory coating composition are that the composition give coatings having the following properties.

1. Non-inflammable and at least predominantly containing an inorganic material,
2. Heat-insulating, even when heated to an extremely high temperature, and capable of maintaining below a specific level of temperature the reverse side of an object coated on the front side,
3. Extremely heat-resistant, at least free from melt, crack, break and like damages even when heated to 1000° C., and capable of being improved in mechanical strength by heating,
4. Flame-resistant and especially able to resist a mass of flame or a stream of flame on contact therewith,
5. Resistant to hot water and particularly capable of withstanding the water ejected from a hose for fire fighting and heated to a high temperature by the heat intensity in the fire, and
6. Resistant to impact and especially, when subjected to flame, able to endure the impact due to the falling or crushing of an object onto the surface of a column, beam, floor or the like coated with the coating composition so that the coating will not separate from the surface in the flame.

Various inorganic lightweight bodies or usually inorganic foamed bodies are known and these bodies have heat-insulating and fire-resistant properties as well as lightweight characteristic. Some of the materials for preparing such bodies may be used to produce coating compoiitions. The resulting coating compositions give layers having improved lightweight and enhanced heat-insulating properties, hence desirable as the coating composition.

Typical examples of known refractory coating compositions are those of the inorganic fibrous type. However, the coating compositions of this type have the following defects and fail to fulfill most of the requirements for the desired coating compositions. In respect of the item 2 of the requirements stated above, the coating when heated will have a temperature increased at a constant rate or continuosly elevated. Concerning the item 3, the layer will melt or be seriously damaged when heated to 1000° C. Referring to the item 4, a mass of flame penetrates into fibers of the coating, eventually reaching the surface of a substrate. As regards the items 5 and 6, the coating is caused to separate from the surface of a substrate, perticularly metal substrate.

Known compositions for preparing lightweight bodies are disclosed for example in Japanese Unexamined Patent Publication No.85450/1980. The compositions for lightweight bodies described in this publication comprise:

(a) a water-soluble alkali metal silicate,
(b) cement,
(c) a foaming stabilizer,
(d) a metallic foaming agent, and
(e) silica dust These compositions can be made into lightweight foamed bodies with extreme ease at ordinary temperature and ordinary pressure which bodies have various excelent properties for lightweight bodies.

If the foregoing compositions for lightweight bodies are usable as refractory coating compositions, the resulting lightweight and heat-insulating characteristics would be advantageously utilized. However, the compositions when used for this purpose will give layers having low thermal conductivity and poor fire resistance as will be described later in examples.

It is an object of this invention to provide refractory coating compositions which fulfill the requirements for the desired fire-resistant coating compositions.

It is another object of the invention to provide refractory coating compositions which give lightweight and markedly heat-insulating layers.

It is a further object of the invention to provide refractory coating compositions capable of depositing non-inflamable and highly heat-insulating coatings.

It is a still further object of the invention to provide refractory coating compositions for forming layers which have an extremely high heat resistance and flame resistance.

It is an additional object of the invention to provide refractory coating compositions for forming layers which are remarkable in resistance to hot water and in resistance to impact.

It is yet another object of the invention to provide refractory compositions for preparing lightweight foamed bodies which meet the requirements for the desired lightweight refractory bodies.

These objects and other characteristics of the invention will become more apparent from the following description.

The foregoing objects of the invention can be achieved by using a refractory coating composition comprising as the active components:

(A) a water-soluble alkali metal silicate,
(B) a hardening agent for the alkali metal silicate, and
(C) a material having an ability to release the water contained therein in larger amounts at increased high temperatures (hereinafter referred to as "high temperature-dewatering ability").

The inventor's research revealed the followings.

(I) The coating compositions containing the three components (A to C components) described above meet the requirements for the desired refractory coating compositions to a substantially satisfactory extent.

(II) The coating compositions comprising as the active components a water-soluble alkali metal silicate, a hardening agent for the alkali metal silicate, a metallic foaming agent, a foaming stabilizer and a material having a high temperature-dewatering ability were found to possess prominently excellent properties of giving lightweight refractory layers.

The material having a high temperature-dewatering ability to be used in this invention has not been employed heretofore as a component in the compositions for forming refractory layers or lightweight referactory layers. A major characteristic of the present invention resides in the use of the material as one of the components in the compositions as contemplated.

The term "material having a high temperature-dewatering ability" used herein refers to a material having an ability to liberate the water contained therein in increasingly large amounts when the material has been heated to a temperature higher than 100° C. The material to be used in this invention, when heated to 600° C., is capable of removing more than 15% by weight of the water present therein, based on 100% by weight of the material at 100° C. This material contains water in the form of e.g. adsorption water or crystal water.

Examples of useful materials having the high temperature-dewatering ability include:
(1) Those of the alumina hydrate type such as Al(OH)$_3$, gibbsite, boehmite, diaspore, bayernite, etc.
(2) Those of the zeolite type such as chabazite, heulandite, mordenite, etc.
(3) Those of the silica-alumina type such as allophane, halloysite, vermiculite, etc.
(4) Those of the magnesia type such as brucite, attapulgite, etc.
(5) Others such as ettringite, etc.

Examples of useful alkali constituents of the water-soluble alkali metal silicates (A component) are alkali metals, such as lithium, sodium, potassium and rubidium. Sodium and pottasium are especially preferable since they are readily available inexpensively and yet highly effective in promoting hardening, increasing the adhesion of the layer on a metallic substrate, preventing the mechanical strength of the layer from lowering by heating and favoring foaming. Further insofar as A component is soluble in water, the composition thereof or the mole ratio of the alkali metal oxide to $SiO_2$ is not limited. However, it is preferable that the mole ratio be 1.5 to 4.0, more preferably about 1.8 to about 3.0. When a foamed body is prepared, the present composition including these components in the mole ratio of 1.8 to 3.0 gives the body an outstanding water resistance and high mechanical strength. Since A components are usable singly, or at least two of them can be used conjointly, in the form of a powder or an aqueous solution. For the ease of preparation of pases, an aqueous solution is preferable which has a solids concentration of at least 10 wt. %, usually about 10 to 50 wt. %. In this case, merely when the aqueous solution is admixed with the other components, a pasty composition can be prepared with ease which undergoes only reduced shrinkage during hardening.

The hardening agent for the water-soluble alkali silicate, i.e. B component of the present composition, is at least one material selected from the group consisting of hydraulic cements, silica dust, zinc oxide, acidic metallic oxides, metal salts of higher fatty acids other than monovalent metal salts, metal salts, other than monovalent metal salts, of water-soluble high-melecular-weight substances having carboxyl, phosphates, borates, sulfates of divalent metals and sulfites of divalent metals. More specifically useful hardening agents include the following materials and components. Examples of useful hydraulic cements are hydraulic lime, natural cement, portland cenent, alumina cement, and lime-containing cement, blast furnance cement, silica cement, fly ash cement, masonry cement, sulfated cement and like mixed cements. Typical of useful metal salts, other than monovalent metal salts, of higher fatty acids are zinc salts, aluminum salts, calcium salts, barium salts, magnesium salts and nickel salts of stearic acid and palmitic acid. The metal salts, other than monovalent metal salts, of water-soluble high-molecular-weight substances containing carboxyl are salts comprising a metal, other than monovalent metals, and such a water-soluble substance. Examples of at least divalent metals are Zu, Cu, Ca, Mg, Be, Sr, Ba, Al, Ti, Zr, Sb, Cr, Mo, W, Su, Mn, Fe, Co, Ni and V. Examples of water-soluble high-molecular-weight substances are alginic acid, polyacrylic acid, polymethacrylic acid, cellulose derivatives, alkyd resin, aminoalkyd resin, etc. Silica dust is obtained as a byproduct from electro-metallurgical processes for preparing silicon and silicon alloys. Preferably the silica dust is about 0.1 to about 1.0 $\mu$ in particle size, about 5 to about 50 m$^2$/g in specific surface area and about 0.1 to about 0.3 in specific gravity and contains at least 60% by weight, preferably at least 80% by weight, of $SiO_2$. Examples of useful acidic metallic oxides are $Cr_2O_3$, MnO, $Mn_3O_4$, FeO, CoO, PbO, etc. Examples of useful phosphates are aluminum phosphate, calcium phosphate, zinc phosphate, thallium phosphate, strontium phosphate, barium phosphate, magnesium phosphate, manganese phosphate, etc. Examples of useful borates are zinc borate, magnesium borate, manganese borate, lead borate, nickel borate, calcium borate, etc. Examples of useful sulfates of divalent metals are magnesium sulfate, zinc sulfate, calcium sulfate and barium sulfate. Examples of useful sulfites are calcium sulfite, magnesium sulfite, zinc sulfite and copper sulfite.

According to this invention, a metallic foaming agent (D component) and/or a foaming stabilizer (E component) can be added to the above-mentioned three components to prepare compositions giving lightweight refractory layers or lightweight bodies.

Various metal elements, metal alloys and intermetallic compounds are usable as metallic foaming agents, i.e. as D components, according to the invention. Examples of useful metal elements are those in Groups IIB, IIIA, IIIB, IVA, IVB, VA, VB, VIB, VIIB and VIII of the Periodic Table, among which those belonging to the third to fifth periods are preferable. More specific examples of preferred elements are Cr, Mn, Ti, Zr, V, Si, Ge, Sb, Fe, Co, Ni, Cu, Zn, Al, Ca, Sn, etc., among which Ti, Zr, V, Al, Si, Ge, Sb and Zn are especially preferred. In this invention, metalloid elements, such as B and As are similarly usable. Typical examples of useful alloys or intermetallic compounds (metal-to-metal compounds of metal-to-nonmetal compounds) are Al-Si, Al-Ti, Al-Mn, Al-Cu-Si, Al-Cu, Zn-S, Zn-Sn, Cu-Si, Fe-Si, Si-Ni, Co-Sb, etc. The B components are used singly, or at least two of them are used in admixture. They are used in the form of fine particles, preferably up to 150$\mu$ in size.

Foaming stabilizers useful as E components of this invention are inorganic materials, such as silica gel, carbon black, active carbon, talc, mica, and sepiolite; sufactants (other than metallic soaps); and organic materials, such as animal proteins and dimethylsilicon derivatives, which are known as air-entraining agents for cements. Examples of useful surfactants are various and include anionic surfactants such as sodium polyoxyethylene alkyl-sulfonate and sodium alkyl-naphthalene sulfonate, cationic surfactants such as laurytrimethyl ammonium chloride and like quaternary ammonium salts, nonionic surfactants such as polyoxyethylene glycol oleate and polyoxyethylene glycol laurate, and ampholytic surfactants such as sodium N-alkyl-$\beta$-aminopropionate. Such E components act to disperse D component in the system uniformly and to assure stabilized foaming and are therefore effective in forming minute uniform pores. E component, when inorganic, is preferably used in the form of particles up to 200$\mu$ in size.

The compositions of this invention comprise A to C components or a combination of A to C components with D component and/or E component. The proportions of A to E components are usually as follows.

|             | Part by weight (calculated as solids) |
|-------------|---------------------------------------|
| A component | 100                                   |
| B component | 3 to 250                              |
| C component | 20 to 700                             |
| D component | 0 to 50                               |
| E component | 0 to 200                              |

The proportion of B component is 15 to 250 parts by weight when it is a hydraulic cement, silica dust or zinc oxide, or 3 to 30 parts by weight when it is a metal salt of higher fatty acid or water-soluble high-molecular-weight material having carboxyl, acidic metallic oxide, phosphate, borate, sulfate of divalent metal or sulfite of divalent metal. C component is used in an amount of preferably 100 to 600 parts by weight, or more preferably 300 to 500 parts by weight. While a refractory coating composition can be prepared from the components of this invention excluding D component, a coating composition for a lightweight retractory foamed layer can be produced from the components including D component. D component is employed preferably in an amount of about 5 to about 40 parts by weight to assure satisfactory foaming. If D component is not added, E component, i.e. a foaming stabilizer, can be dispensed with, but the use of E component without D component will not produce any adverse effect. The proportion of E component is 0 to about 250 parts by weight when it is an inorganic powder, or 0 to about 18 parts by weight when it is an organic material.

In accordance with the application contemplated, the present composition may contain at least one of a fibrous material (F component) a water-soluble resin (G component) and an inorganic swelling material (H component). The fibrous material (F component) serves to increase the bending strength of the refractory coating and acts to mitigate the shrinkage of the coating during hardening. It is preferred to use F component in preparing a composition for forming a lightweight refractory foamed coating. The addition of F component at ordinary temperature gives the coating 1.5 times higher bending strength than otherwise and reduces by about one half the shrinkage which otherwise would occur. When an inorganic material is used as the fibrous material, the activities as contemplated are maintained even at high temperatures. The proportion of F component is less than about 30 parts by weight, based on 100 parts by weight of A component (calculated as solids). With an excess of a fibrous material present, the composition has a decreased flowability and will not foam smoothly. Examples of useful fibrous materials are inorganic fibers such as glass fiber, rock wool, asbestos, carbon fiber, quartz fiber, silica fiber and aluminum silicate fiber, and organic fibers such as cellulose acetate fiber, polyester fiber and acrylic fiber. Such fibrous materials are used in the form of chopped strands of monofilaments. The water-soluble resin (G component) renders the composition easier to handle for the application and gives a little higher mechanical strength (20 to 30%). The proportion of G component is less than about 30 parts by weight, based on 100 parts by weight of A component (calculated as solids). If G component is used in excess, the foamed coating may be given reduced water resistance and lower non-inflammability. Examples of useful water-soluble resins are water-soluble synthetic resins such as polyethylene oxide, polyethylene glycol and polyvinyl pyrrolidone; cellulose ethers such as methyl cellulose and carboxylmethyl cellulose; and water-soluble natural resins such as gelatin, gum arabic, sodium alginate, protein, starch and dextrin; etc. These water-soluble resins are used in the form of particles or as formulated into an aqueous solution in which the resin can be fully mixed with the silicate and well dispersed in the silicate after subsequent formation of dry solids.

The inorganic swelling material (H component) may be added to improve the flowability and workability of the present composition or particularly of the present lightweight composition. For example, it can prevent the compoition applied to a wall, ceiling or the like from falling off the place in masses. The proportion of H component is less than about 60 parts by weight, based on 100 parts by weight of A component (calculated as solids). Examples of useful H components are clays with high plasticity such as kaoline, bentonite and activated clay; white carbon; hydrous magnesium silicate; etc.

According to this invention, other additives can be incorporated. The other additives include molten quartz, cristobalite, alumina, fly ash, calcium carbonate, siliceous powder, pottery powder, inorganic pigments and granular lightweight aggregates. These additives serve to give a reduced bulk density and an increased volume to the coating and to reinforce the coating. Useful granular lightweight aggregates are organic or inorganic and include foamed or crushed granules or grains of synthetic resins prepared from vinyl chloride, phenol, urea, styrene, urethane and ethylene; foamed or crushed granules or grains of synthetic rubbers and like organic lightweight aggregates; fired vermiculite, expanded shale, fired perlite, silica balloon, granular foamed silica and like inorganic foamed materials; inorganic synthetic lightweight aggregates; crushed foamed concrete; etc.

The proportions of these additives are 0 to about 100 parts by weight, based on 100 parts by weight of A component.

The present coating composition is mixed with a suitable amount of water before application and is applicable by the common method such as trowelling, spraying, etc.

An air-entraining agent may be added to A, B and C components to prepare the present composition for lightweight bodies or layers. The amount of the air-entraining agent is 0 to 50 parts by weight based on 100 parts by weight of A component. In forming lightweight bodies or layers, the air-entraining agent is added to an aqueous solution of A component and thereto are added B and C components whereupon the resulting mixture is left to stand. The lightweight body layer thus obtained usually has a bulk density of more than 0.7 g/cm$^3$, and poses no problem in practical use although it is a little lower in mechanical strength than the body or layer prepared from the present composition containing the metallic foaming agent.

This invention will be described below in greater detail with reference to examples, in which various properties were determined by the test methods given below. In the methods of (1) to (6), and (12) and (13) below, shaped bodies were used, whereas in the methods of (7) to (11) below, coatings were employed.

(1) Hardening end time ... The time (minutes) that lapsed until a shaped body becomes hard enough not to permit sinking of a 500-g weight placed thereon.
(2) Bulk density ... According to JIS A 1161 (Unit: g/cm³)
(3) Compression strength at ordinary temperature ... According to JIS A 1161 (Unit: kg/cm²)
(4) Compression strength after heating at 500° C. for 2 hours ... A shaped body was placed in an electric furnace, heated at 500° C. for 2 hours, left to stand until it was cooled to ordinary temperature and tested by the method of (3) above (Unit: kg/cm²).
(5) Compression strength after heating at 1000° C. for 2 hours ... A shaped body was placed in an electric furnace, heated at 1000° C. for 2 hours, cooled to ordinary temperature by being allowed to stand and then tested by the method of (3) above (Unit: kg/cm²)
(6) Bending strength ... According to JIS Z 2248 (Unit: kg/cm²)
(7) Adhesion at ordinary temperature ... A coating was formed on a plain steel plate and the adhesion was measured by the adhesion strength test specified in JIS A 6909 (Unit: kg/cm²).
(8) Adhesion after heating at 500° C. for 2 hours ... The surface only of a coating was exposed to heat of 500° C. in an electric furnace for 2 hours, cooled to ordinary temperature and then tested by the method of (7) above (Unit: kg/cm²).
(9) Adhesion after heating at 1000° C. for 2 hours ... The surface only of a coating was exposed to heat of 1000° C. in an electric furnace for 2 hours and tested by the method of (7) above after cooling to ordinary temperature (Unit: kg/cm²).
(10) Resistance to hot water ... The surface only of a coating was subjected to heat of 1000° C. in an electric furnace for 2 hours and then withdrawn whereupon hot water of 60° C. was applied to the coating for 5 minutes with pressure of 1.5 kg/cm² by an ejection device having a nozzle 1 mm in diameter.
(11) Resistance to impact ... The surface of a coating was exposed to heat 1000° C. in an electric furnace for 2 hours and withdrawn whereupon a 500-g weight was dropped onto the coating from a height of 50 cm.
(12) Thermal conductivity ... According to JIS R 2616 (Unit: kcal/m hr ° C.)
(13) Resistance to heat transmission ... A shaped body with a thermocouple set in the center thereof was exposed to heat of ambient temperature of 1000° C. in an electric furnace and was tested to determine the time (t minutes) taken for the temperature in the center to reach 350° C. The resistance to heat transmission was expressed in terms of resistance per unit weight and is given by the following equation $$\alpha = \frac{t}{d} \text{ (min)}$$

wherein d represents the value of the bulk density obtained in the test mentioned above in (2).

The components used in the following examples are given below.

A component (water-soluble alkali metal silicate)

| No. | Material | SiO₂/R₂O mole ratio | (R: alkali metal) Concn. (wt. %) |
|---|---|---|---|
| A-1 | Aq. soln. of potassium silicate | 2.0 | 25 |
| A-2 | Aq. soln. of sodium silicate | 2.5 | 30 |

B component (hardening agent for the alkali metal silicate)

| No. | Material | Composition | Particle Size (μ) |
|---|---|---|---|
| B-1 | Alumina cement | Al₂O₃/CaO = 1.57 | 5–100 |
| B-2 | Portland cement | CaO/SiO₂ = 2.55 | 5–100 |
| B-3 | Zinc oxide | | 1–50 |
| B-4 | Aluminum phosphate | Granular | 10–50 |

C-component (material having a high temperature-dewatering ability)

| No. | Material | Main component | Particle size (μ) |
|---|---|---|---|
| C-1 | Gibbsite | Al₂O₃.3H₂O | 10–300 |
| C-2 | Chabazite | (Ca,Na)(Al₂Si₄O₁₂).6H₂O | 10–300 |
| C-3 | Halloysite | Al(Si₂O₅)(OH)₄.2H₂O | 100–500 |

D component (metallic foaming agent)

| No. | Material | Particle size (μ) |
|---|---|---|
| D-1 | Fe—Si | 5–50 |
| D-2 | Al | 1–50 |

E component (foaming stabilizer)

| No. | Material | Particle size (μ) |
|---|---|---|
| E-1 | Silica gel | 5–50 |
| E-2 | Polyoxyethylene nonylphenyl ether | — |

F component (Fibrous material)

| No. | Material | Fiber length | Remarks |
|---|---|---|---|
| F-1 | Glass fiber | 3 mm | Staple |
| F-2 | Polypropylene fiber | 10 mm | Staple |

G component (water-soluble resin)

| No. | Material | Form |
|---|---|---|
| G-1 | Hydroxyethyl cellulose | Powder |
| G-2 | Polyethylene oxide | Aq. soln. |

H component (inorganic swelling material)

| No. | Material | Particle size (μ) |
|---|---|---|
| H-1 | Bentonite | 5–100 |
| H-2 | Hydrous magnesium silicate | 0.5–10 |

EXAMPLE 1

A 10 kg quantity of No.A-1 aqueous solution serving as A component was placed into a 24-liter polyethylene container. A 3 kg quantity of No.B-1 material as B component and 13 kg of No.C-1 material as C component were mixed together to obtain a powder mixture, which was added to the aqueous solution. The resulting mixture was stirred at room temperature to prepare a uniform paste. The paste was applied by a trowel to the surface of a 6-mm-thick plain steel plate (100×100 mm) to a thickness of 10 mm. The trowel was smoothly movable to apply the paste easily. The coating was smooth-surfaced. The coating completely hardened in 2.5 hours and was tested for properties. On the other hand, the same paste as above was prepared and fed to a mold to obtain a shaped body, which was tested. In the tests for properties stated above in (1) to (5), and (12) and (13), a mold measuring 80×80×80 mm was used, and in the test in (6), a mold measuring 40×40×160 mm was employed. Table 1-B given below shows the results of the tests carried out by the foregoing methods.

The numerals (1) to (13) in the first column of Table 1-B correspond to those of the properties shown above in respect of test methods. For example, the numeral (3) represents the compression strength at ordinary temperature. No change was observed in the tests for (10) resistance to hot water and (11) resistance to impact in all examples. The foaming time and the hardening end time are expressed with the unit of minutes in Table 1-B.

The same can be said in respect of Tables 2-B and 3-B appearing later.

EXAMPLES 2 to 6

Coating and shaped bodies were produced in the same manner as in Example 1 with the exception of using the components listed in Table 1-A given below and were tested for properties with the results shown in Table 1-B below.

The numbers under the column of each example in Table 1-A represent the amounts of the components expressed with the unit of kilogram.

The same can be said in respect of Tables 2-A 3-A and 4 to be referred to later.

EXAMPLE 7 to 12

B, C, D and E components tabulated in Table 1-A were mixed together to obtain a powder mixture, to which an aqueous solution of A component specified in Table 1-A was added. The mixture was stirred at room temperature to prepare a uniform paste. The paste was applied by a trowel to the surface of a 6-mm-thick plain steel plate (100×100 mm) to deposit a foamed coating having a thickness of 10 mm. The trowel was smoothly movable to apply the paste easily. The coating was smooth-surfaced. The coating started to foam after 30 minutes and completely hardened in 3.0 hours. In this way, six kinds of coatings were formed by using the components indicated in Table 1-A. On the other hand, the same paste as above was prepared and supplied to a mold to obtain a foamed shaped body. In the same manner, five other types of foamed shaped bodies were produced with the exception of using the components listed in Table 1-A. Test results are shown in Table 1-B.

TABLE 1-A

| Component | \multicolumn{12}{c|}{Example} |
|---|---|---|---|---|---|---|---|---|---|---|---|---|
|  | 1 | 2 | 3 | 4 | 5 | 6 | 7 | 8 | 9 | 10 | 11 | 12 |
| No. A-1 | 10 | 10 | 10 | 10 | 10 | — | 10 | 10 | 10 | 10 | 10 | — |
| No. A-2 | — | — | — | — | — | 10 | — | — | — | — | — | 10 |
| No. B-1 | 3 | 8 | — | — | — | 3 | 3 | 8 | 3 | 3 | 3 | 3 |
| No. B-2 | — | — | 0.5 | — | — | — | — | — | 0.5 | — | — | — |
| No. B-3 | — | — | — | 2 | — | — | — | — | — | 2 | — | — |
| No. B-4 | — | — | — | — | 0.3 | — | — | — | — | — | 0.3 | — |
| No. C-1 | 12 | 10 | 14 | — | — | 13 | 12 | 10 | 14 | — | — | 12 |

TABLE 1-A-continued

| Component | \multicolumn{12}{c|}{Example} |
|---|---|---|---|---|---|---|---|---|---|---|---|---|
|  | 1 | 2 | 3 | 4 | 5 | 6 | 7 | 8 | 9 | 10 | 11 | 12 |
| No. C-2 | — | — | — | 15 | — | — | — | 3 | — | 15 | 11 | — |
| No. C-3 | — | — | — | — | 8 | — | — | — | — | — | — | — |
| No. D-1 | — | — | — | — | — | — | 0.15 | 0.5 | — | — | — | 0.5 |
| No. D-2 | — | — | — | — | — | — | — | — | 0.2 | 0.8 | 0.2 | — |
| No. E-1 | — | — | — | — | — | — | — | — | — | — | 4 | — |
| No. E-2 | — | — | — | — | — | — | — | — | — | — | — | 0.1 |

TABLE 1-B

|  | \multicolumn{12}{c|}{Example} |
|---|---|---|---|---|---|---|---|---|---|---|---|---|
|  | 1 | 2 | 3 | 4 | 5 | 6 | 7 | 8 | 9 | 10 | 11 | 12 |
| Foaming time | — | — | — | — | — | — | 30 | 20 | 30 | 35 | 30 | 40 |
| (1) | 150 | 170 | 150 | 120 | 140 | 180 | 120 | 90 | 95 | 110 | 100 | 120 |
| (2) | 1.5 | 1.5 | 1.4 | 1.5 | 1.4 | 1.5 | 0.9 | 0.55 | 0.70 | 0.35 | 0.40 | 0.55 |
| (3) | 85 | 105 | 70 | 75 | 80 | 100 | 45 | 16 | 25 | 8 | 15 | 13 |
| (4) | 80 | 65 | 60 | 70 | 50 | 75 | 35 | 10 | 18 | 4 | 11 | 8 |
| (5) | 32 | 80 | 65 | 75 | 80 | 80 | 37 | 12 | 17 | 4 | 10 | 9 |
| (6) | 29 | 40 | 24 | 28 | 24 | 39 | 14 | 6 | 10 | 3 | 6 | 5 |
| (7) | 3.1 | 2.4 | 3.6 | 3.3 | 2.9 | 3.3 | 2.3 | 1.9 | 2.2 | 0.7 | 1.5 | 1.8 |
| (8) | 2.2 | 1.8 | 3.1 | 2.2 | 2.6 | 3.0 | 2.0 | 1.7 | 1.8 | 0.5 | 0.9 | 1.2 |
| (9) | 2.0 | 2.2 | 2.2 | 2.1 | 2.0 | 3.5 | 1.8 | 1.2 | 1.4 | 0.4 | 0.9 | 0.9 |
| (10) | — | — | — | — | — | — | — | — | — | — | — | — |
| (11) | — | — | — | — | — | — | — | — | — | — | — | — |
| (12) | 0.42 | 0.47 | 0.40 | 0.45 | 0.47 | 0.43 | 0.12 | 0.07 | 0.08 | 0.06 | 0.07 | 0.07 |
| (13) | 32.0 | 30.7 | 33.6 | 31.3 | 30.7 | 32.7 | 48.9 | 63.6 | 52.9 | 94.3 | 76.0 | 88.0 |

EXAMPLES 13 TO 18

Coatings and foamed shaped bodies were made by following the procedure of Example 1 with the exception of using the components listed in Table 2-A given below. Table 2-B below indicates test results.

TABLE 2-A

| Component | Ex. 13 | Ex. 14 | Ex. 15 | Ex. 16 | Ex. 17 | Ex. 18 |
|---|---|---|---|---|---|---|
| No. A-1 | 10 | 10 | 10 | 10 | 10 | 10 |
| No. A-2 | — | — | — | — | — | — |
| No. B-1 | 3 | 3 | 3 | 3 | 3 | 3 |
| No. B-2 | — | — | — | — | — | — |
| No. B-3 | — | — | — | — | — | — |
| No. B-4 | — | — | — | — | — | — |
| No. C-1 | 12 | 12 | 12 | 12 | 12 | 12 |
| No. C-2 | — | — | — | — | — | — |
| No. C-3 | — | — | — | — | — | — |
| No. D-1 | — | — | — | — | — | — |
| No. D-2 | — | — | — | — | — | 0.5 |
| No. E-1 | — | — | — | — | — | 2 |
| No. E-2 | — | — | — | — | — | — |
| No. F-1 | 0.2 | — | — | — | — | 0.2 |
| No. F-2 | — | 0.5 | — | — | — | — |
| No. G-1 | — | — | 0.01 | — | — | 0.01 |
| No. G-2 | — | — | — | 0.02 | — | — |
| No. H-1 | — | — | — | — | 1 | — |
| No. H-2 | — | — | — | — | — | 0.5 |

TABLE 2-B

|  | Ex. 13 | Ex. 14 | Ex. 15 | Ex. 16 | Ex. 17 | Ex. 18 |
|---|---|---|---|---|---|---|
| Foaming time | — | — | — | — | — | 30 |
| (1) | 150 | 140 | 160 | 150 | 180 | 130 |
| (2) | 1.5 | 1.5 | 1.4 | 1.4 | 1.4 | 0.5 |
| (3) | 83 | 86 | 110 | 113 | 90 | 22 |
| (4) | 70 | 77 | 65 | 68 | 65 | 14 |
| (5) | 72 | 72 | 50 | 55 | 60 | 11 |
| (6) | 45 | 38 | 31 | 29 | 35 | 10 |
| (7) | 4.0 | 5.0 | 4.2 | 3.0 | 3.3 | 2.4 |
| (8) | 3.0 | 4.2 | 2.7 | 2.5 | 2.1 | 2.0 |
| (9) | 3.5 | 2.0 | 2.1 | 2.5 | 2.0 | 2.0 |
| (10) | — | — | — | — | — | — |
| (11) | — | — | — | — | — | — |
| (12) | 0.43 | 0.43 | 0.44 | 0.42 | 0.42 | 0.07 |

TABLE 2-B-continued

|  | Ex. 13 | Ex. 14 | Ex. 15 | Ex. 16 | Ex. 17 | Ex. 18 |
|---|---|---|---|---|---|---|
| (13) | 30.7 | 30.0 | 30.0 | 34.3 | 33.6 | 98.0 |

COMPARISON EXAMPLES 1 TO 5

The procedure of Example 1 was repeated with the exception of using the components listed in Table 3-A appearing later to produce coatings and foamed shaped bodies. Test results are shown in Table 3-B below.

In Table 3-B, the letter C stands for "collapsed"; the letter P for "peeled off"; the letters S for "separated"; and the letter L for "largely cracked".

TABLE 3-A

| Component | Comparison Example | | | | | | | | | |
|---|---|---|---|---|---|---|---|---|---|---|
|  | 1 | 2 | 3 | 4 | 5 | 6 | 7 | 8 | 9 | 10 |
| No. A-1 | 10 | 10 | 10 | 10 | 10 | 10 | 10 | 10 | — | — |
| No. A-2 | — | — | — | — | — | — | — | — | — | — |
| No. B-1 | 0.2 | — | 3 | 3 | 3 | 3 | 3 | 3 | 3 | 10 |
| No. B-2 | — | 10 | — | — | — | — | — | — | — | — |
| No. B-3 | — | — | — | — | — | — | — | — | — | — |
| No. B-4 | — | — | — | — | — | — | — | — | — | — |
| No. C-1 | 13 | — | 1 | — | — | 20 | 20 | — | 10 | 13 |
| No. C-2 | — | 13 | — | 20 | 1 | — | — | — | — | — |
| No. C-3 | — | — | — | — | — | — | — | — | — | — |
| No. D-1 | — | — | — | — | 0.2 | — | 0.2 | 0.2 | — | — |
| No. D-2 | — | — | — | — | — | 0.2 | — | — | 0.2 | — |
| No. E-1 | — | — | — | — | — | — | 2 | 2 | 2 | — |
| No. E-2 | — | — | — | — | — | — | — | — | — | — |
| No. F-1 | — | — | — | — | — | — | — | 0.2 | 0.2 | — |
| No. F-2 | — | — | — | — | — | — | — | — | — | — |

TABLE 3-B

|  | Comparison Example | | | | | | | | | |
|---|---|---|---|---|---|---|---|---|---|---|
|  | 1 | 2 | 3 | 4 | 5 | 6 | 7 | 8 | 9 | 10 |
| Foaming | — | — | — | — | 35 | 40 | 40 | 30 | 20 | — |
| (1) | 250 | 0.5 | 140 | 130 | 130 | 100 | 110 | 120 | 360 | 480 |
| (2) | 1.3 | 1.5 | 1.5 | 1.4 | 0.65 | 1.1 | 1.2 | 0.40 | 0.70 | 1.5 |
| (3) | 45 | 35 | 75 | 55 | 17 | 25 | 30 | 10 | 28 | 75 |
| (4) | 4.1 | 24 | 35 | 28 | 12 | 12 | 22 | 6 | 17 | 23 |
| (5) | 0(C) | 1 | 9 | 1 | 5.2 | 1 | 1.3 | 1 | 0(C) | 0(C) |
| (6) | 12 | 7 | 22 | 17 | 5 | 5 | 3 | 4 | 9 | 20 |
| (7) | 3.5 | 0.2 | 3.1 | 0.1 | 1.9 | 0.1 | 0.1 | 1.8 | 0.4 | 0.3 |
| (8) | 0.2 | 0 | 2.5 | 0 | 1.0 | 0 | 0 | 1.3 | 0.1 | 0 |
| (9) | 0(P) | 0.2 | 0.5 | 0.2 | 0.5 | 0 | 0.2 | 0.4 | 0(P) | 0(P) |
| (10) | C | C | L | C | L | C | L | L | C | C |
| (11) | S | S | S | S | S | S | S | S | S | S |
| (12) | 0.41 | 0.53 | 0.41 | 0.45 | 0.10 | 0.45 | 0.51 | 0.06 | 0.15 | 0.42 |
| (13) | 29.2 | 17.3 | 12.7 | 9.3 | 24.6 | 13.6 | 10.0 | 47.5 | 41.4 | 26.7 |

EXAMPLES 19 to 21

An air-entraining agent and A component listed in Table 4 given below were mixed together, and B and C components specified in Table 4 were added thereto. The resulting mixture was fully stirred and left to stand to obtain a lightweight body. In this way, three kinds of lightweight bodies were produced by using the components listed in Table 4 and were tested for properties with the results shown in Table 4. In Table 4, the air-entraining agents are designated No.I-1, No.I-2 and No.I-3 which represent sodium polyoxyethylene alkyl-sulfonate, polyoxyethylene glycol oleate and polyoxyethylene glycol laurate, respectively.

TABLE 4

| Component | Example 19 | Example 20 | Example 21 |
|---|---|---|---|
| No. A-1 | 10 | 10 | 10 |
| No. B-1 | 3 | 3 | 3 |
| No. C-1 | 12 | 12 | 12 |
| No. I-1 | 0.5 | — | — |
| No. I-2 | — | 0.8 | — |
| No. I-3 | — | — | 0.4 |
| (1) | 150 | 150 | 150 |
| (2) | 0.95 | 0.94 | 0.95 |
| (3) | 40 | 40 | 40 |
| (4) | 30 | 30 | 30 |
| (5) | 35 | 35 | 34 |
| (6) | 12 | 12 | 12 |
| (7) | 0.8 | 0.8 | 0.8 |
| (8) | 0.5 | 0.5 | 0.5 |
| (9) | 0.2 | 0.2 | 0.2 |
| (10) | — | — | — |
| (11) | — | — | — |
| (12) | 0.13 | 0.12 | 0.13 |
| (13) | 41.1 | 41.0 | 41.0 |

I claim:

1. Refractory coating compositions comprising as the active components:
   (A) 100 parts by weight of a water-soluble alkali metal silicate,
   (B) 3 to 250 parts by weight of a hardening agent for the alkali metal silicate, and
   (C) 100 to 600 parts by weight of a material, having an ability to release more than 15% by weight of the water contained therein when heated to 600° C., based on 100% by weight of the material at 100° C.

2. Compositions as defined in claim 1 in which the material (C) is at least one of gibbsite, aluminum hydroxide, boehmite, diaspore, chabazite, heulandite, mordenite, allophane, halloysite, vermiculite, brucite, attapulgite and ettringite.

3. Compositions as defined in claim 1 which contain, as the active component, (E) a foaming stabilizer in addition to the active components (A) to (D).

4. Compositions as defined in claim 3 in which the foaming stabilizer is at least one of silica gel, carbon black, active carbon, talc, mica, and sepiolite.

5. Compositions as defined in claim 3 in which the foaming stabilizer is at least one of surfactants other than soaps, dimethylsilicon derivatives and animal protein-type air entraining agents.

6. Compositions as defined in claim 1 which further contain, as an active component, (D) a metallic foaming agent.

* * * * *